Sept. 15, 1931.  A. MOORHOUSE  1,823,695
MOTOR VEHICLE
Filed Dec. 16, 1927
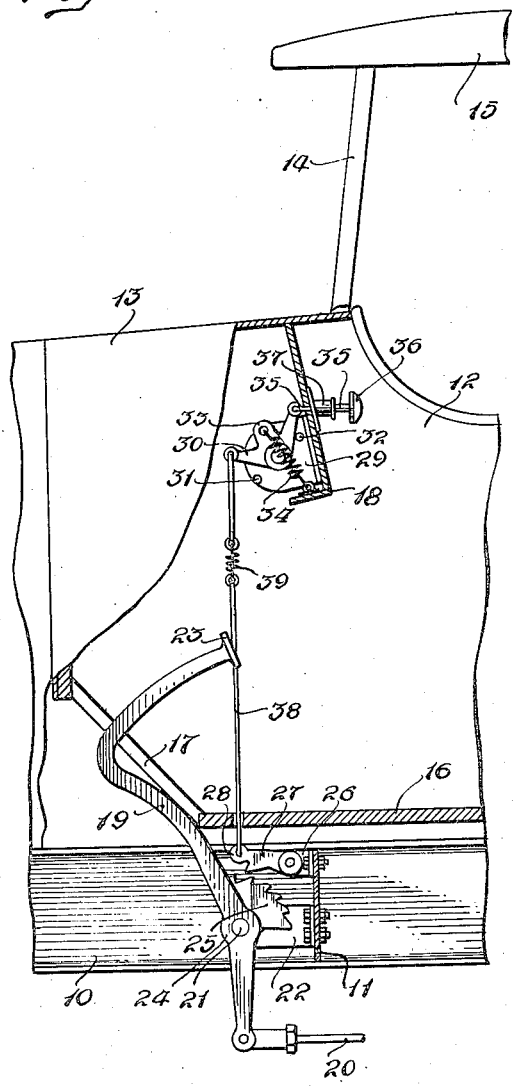
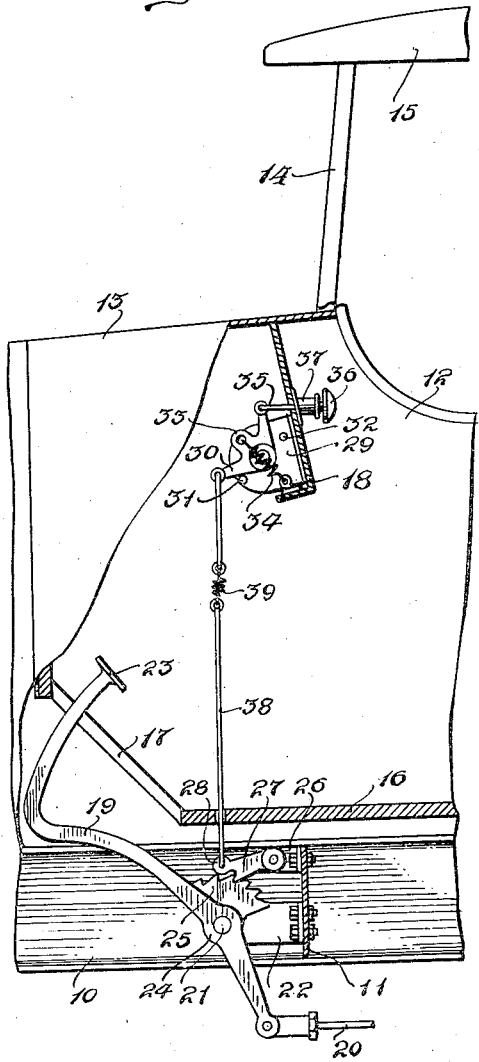
Inventor
Alfred Moorhouse
Attorney Patented Sept. 15, 1931

1,823,695

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed December 16, 1927. Serial No. 240,381.

This invention relates to motor vehicles and more particularly to brakes therefor.

An object of the invention is an improvement in vehicle brakes.

Another object of the invention is to provide means for retaining foot brakes in applied position.

Another object of the invention is to provide means operable from the instrument board of a motor vehicle for retaining foot brakes in applied position.

Another object of the invention is to provide means for retaining the foot brakes of motor vehicles in applied position from which position they cannot be released without first depressing the foot brake lever.

A further object of the invention is to provide means operable from the instrument board of a motor vehicle for retaining foot brakes in applied position, the structure being such that the operating means remains unoperable so long as the foot brake lever is in engagement with the retaining means.

A still further object of this invention is to provide means for retaining the foot brakes of a motor vehicle in applied position, said means being operable from the instrument board of the vehicle and so arranged that it may be automatically applied upon the application of the foot brakes.

A still further object of the invention is to provide means for retaining the foot brakes of a motor vehicle in applied position, the same having the advantage of a positive retaining means, highly efficient in operation, and yet of marked simplicity as a whole and in respect to each of its component parts, so that its manufacture is economically facilitated both as regards to parts and their assembly.

Further objects and advantages of the invention reside in the various combinations herein described and claimed as will be apparent upon reference to the following specification and to the accompanying drawings, in which:

Figure 1 is a view in side elevation of a portion of a motor vehicle partly in section illustrating the brake locking device as applied, the same being shown in unlocked position, and Figure 2 is a similar view illustrating the device in locked position.

Referring to the drawings for more specific details of the invention, 10 represents a side member of a chassis frame, it of course being understood that there are two such members. These members are connected by cross members 11 arranged adjacent to the respective ends of the side member 10 and at intermediate points. Resting upon the frame is a vehicle body 12 including a cowl 13 upon which is secured a windshield 14 supporting a top 15. The body is provided with the usual floor boards 16, a foot board 17 and an instrument board 18. As shown, the instrument board is supported by and beneath the cowl.

A foot brake pedal lever 19 to which is connected a brake rod 20, is mounted upon a shaft 21 supported in any suitable manner or as shown, by a bracket 22 secured to one of the cross members 11. The lever projects upwardly through the foot board 17 and is provided upon its free end with a pedal 23. Formed upon the hub 24 of the lever is a segmental ratchet 25 preferably set to one side of a perpendicular plane through the lever. Secured upon the cross members 11 is a bracket 26 to which is pivoted a pawl 27 adapted to engage the ratchet 25, the pawl being provided upon its free end with an eye 28, the object of which will hereinafter appear.

Secured upon the back of the instrument board 18 is a bracket 29 having pivoted thereon a bell crank lever 30 limited in its movement by stops 31 and 32 arranged upon the bracket. This lever is provided with an intermediate arm 33 to which is attached one end of a spring 34, the other end of the spring being secured to the bracket in such a position that upon actuation of the lever it will snap either into the unlocked position where it will engage the stop 32 or into the locked position where it will rest upon the stop 31.

Attached to one arm of the bell crank lever 30 is an actuating rod 35 provided with a knob 36, the rod being mounted in a sleeve 37 positioned upon the instrument board. The other arm of the bell crank lever is connected by a rod 38 to the eye 28 in the free end of the pawl 27. The rod 38 is in two parts connected by a coil spring 39 which serves to prevent actuation of the pawl when in engagement with the ratchet without first actuating the brake lever.

It will be understood that upon depressing the foot brake lever to apply the brakes, not shown, the lever may be readily locked in the depressed position or the position in which the brakes are applied by pushing upon the knob 36 to actuate the bell crank lever 30 which in turn lowers the pawl 27 for engagement with the ratchet 25 carried by the foot brake lever. When the pawl is in engagement with the ratchet it cannot be disengaged by pulling out on the knob 36 until the foot lever has been further depressed to permit disengagement of the pawl with the ratchet. Any attempt to disengage the pawl from the ratchet by the actuation of the bell crank lever and its associated parts will result only in placing a tension on the coil spring 39 interposed in the rod connecting the pawl with the bell crank lever.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of my invention, what I claim is new and desire to secure by Letters Patent is:

1. In a motor vehicle, in combination with the foot brakes, a lever for operating the brakes, a ratchet carried by the lever, a pawl for cooperation with the ratchet, a bell crank lever upon the instrument board of the vehicle, means accelerating the movement of the bell crank lever into locked and unlocked positions, a handle connected to one arm of the bell crank lever, a rod connecting the other end of the bell crank lever to the pawl and a coil spring interposed in said rod.

2. In a motor vehicle, in combination with the foot brakes, a lever for operating said brakes, a ratchet associated with said lever, a pawl cooperating with the ratchet, a bell crank lever upon the instrument board of the vehicle, an intermediate arm on the bell crank lever, a spring connected to the intermediate arm for accelerating the throw of the lever, a handle positioned on the instrument board and connected to one arm of the lever, a rod connecting the other arm of the lever to the pawl and a coil spring interposed in said rod.

In testimony whereof I affix my signature.

ALFRED MOORHOUSE.